United States Patent [19]

Schneider

[11] 4,440,500
[45] Apr. 3, 1984

[54] HIGH PRESSURE IMPINGEMENT MIXING APPARATUS

[75] Inventor: Fritz W. Schneider, Louisville, Ky.

[73] Assignee: Polyurethane Technology of America-Martin Sweets Company, Inc., Louisville, Ky.

[21] Appl. No.: 390,777

[22] Filed: Jun. 21, 1982

[51] Int. Cl.³ .............................................. B01F 5/04
[52] U.S. Cl. .................................... 366/177; 366/189; 366/268; 366/269; 422/133
[58] Field of Search ............... 366/268, 269, 173, 177, 366/159, 189, 182; 425/557, 558, 205; 137/606, 563; 422/133

[56] References Cited

U.S. PATENT DOCUMENTS

| | | |
|---|---|---|
| 3,706,515 | 12/1972 | Keuerleber et al. |
| 3,924,989 | 12/1975 | Athausen |
| 3,926,219 | 12/1975 | Ersfeld et al. ............ 366/173 X |
| 4,070,008 | 1/1978 | Schlieckmann ............ 366/189 X |
| 4,175,874 | 11/1979 | Schneider |
| 4,239,732 | 12/1980 | Schneider |
| 4,314,963 | 2/1982 | Boden et al. ............ 422/133 X |

OTHER PUBLICATIONS

Brochure of Hennecke, GmbH Entitled "Nobody Mixes Better in the Highest Circles".
Brochure of Krauss Maffei AG, Entitled "Our New Krauss-Maffei Light Weight Champion Certainly Does Stir Things Up!".
Brochure by Cannon—M.P.F.P. Hochdruck-Mischkop.
Article Entitled "Reaction Injection Molding", by Walter E. Becker.

*Primary Examiner*—Philip R. Coe
*Attorney, Agent, or Firm*—Brumbaugh, Graves, Donohue & Raymond

[57] ABSTRACT

Apparatus for high pressure impingement mixing includes a mixing chamber and aftermixer chamber located on opposite sides of, and perpendicular to, a transfer dispense chamber. Two or more reactive components are injected into the mixing chamber. The resultant mixture is directed across the transfer dispense chamber into the aftermixer chamber, and from the aftermixer chamber back into the transfer dispense chamber and around the crossing mixture to the outlet of the transfer dispense mixer for dispensing. Each chamber includes a plunger which is actuated sequentially to interrupt mixing and clean the respective chamber. The device provides effective and intimate mixing of the reactive components and dispenses a stable emulsion so that the device can be used in applications presently suitable only for low pressure mixing devices. It may also be used in existing high pressure applications but without the need for conventional aftermixer devices and gating systems disposed in the forming molds.

12 Claims, 4 Drawing Figures

HIGH PRESSURE IMPINGEMENT MIXING APPARATUS

BACKGROUND OF THE INVENTION

The present invention is a device for high velocity impingement mixing and dispensing of two or more liquid polymeric reactants, for example polyurethane, in which the mixed reactants are dispensed into a mold cavity or onto a surface.

In high pressure impingement mixing, two or more liquid polymeric reactants are directed, from opposite directions, into a common mixing chamber so that the reactants are mixed together to achieve a uniform reaction. The mixed reactants are dispensed from the mixing chamber into a mold cavity or onto a surface. Typical mixing devices of this type are shown and described in U.S. Pat. No. 3,706,515 and U.S. Pat. No. 4,239,732.

In one type of application, mixing heads of this type are used for reaction injection molding (RIM). In RIM applications, the mixing head is installed as part of the closed mold, for example by being mounted in one of the mold dies. The mixed materials are dispensed into the mold cavity using aftermixer devices, runners, and film gates.

Mixing heads of the type shown in the aforementioned patents may also be used for open pour applications, e.g. where the mixed materials are dispensed into open molds which are closed after dispensing the reactants. However, in open pour applications, the use of known high pressure impingement mixing apparatus is limited to the processing of only certain chemicals. Due to the absence of aftermixer devices (which remix the reactants) and other RIM apparatus, known high pressure apparatus is limited to chemicals which can be mixed in a very short period of time and limited to chemicals in which the mixture, which is essentially an emulsion, is of the type that remains stable until the viscosity of the mixture increases, because of progressing polymerization and creaming, to a degree sufficient to prevent the phase separation of the reactants.

In view of the shortcomings of known high pressure impingement mixing apparatus, it has not been possible to process on such equipment certain eleastomeric type materials, for example, materials used for the production of automobile fascia parts, or furniture parts, unless the high pressure mixing head was used in conjunction with well designed aftermixer devices and gate systems integrated into the molds. Similarly, in open mold applications, despite the progress in high pressure impingement mixing and new developments in chemicals, it has not been possible to produce products such as polyurethane shoe soles, using high pressure equipment, of the same, good quality as achieved using low pressure metering and mixing systems.

The same is true for the production of parts produced from self-skinning foam materials, where the skin represents the final surface of the part. Typical parts of this kind are arm rests for cars, aircraft or furniture, as well as headrests and steering wheels. Irregularities in the skin surface due to poor or incomplete mixing, or separation effects, and lead-lag spots in the surface renders the part useless. Until now, this type of material could only be processed on low pressure machines or processed with high pressure impingement equipment using specialized molds, that is, molds fitted with appropriate aftermixer devices and gate systems.

The ability to use high pressure impingement devices in applications where it is presently only possible to use low pressure systems, is highly desirable. High pressure impingement devices have mechanical clean out of the reactants in the mixing chamber, which provides considerable savings, relative to low pressure systems, due to the elimination of solvent flush required for low pressure machines, as well as a drastic reduction of waste material. The environmental hazards and problems connected with the use of solvents, for example, methylene chloride, utilized in low pressure apparatus would also be eliminated.

The substitution of high pressure mixing apparatus, if the mixed product were of a quality equivalent to the low pressure systems, could also readily be effected. Molds and mold clamps presently in use for low pressure systems could be retained, without modification, for the high pressure impingement mixing. Also, in high pressure mixing, if apparatus were available which would not, for effective mixing and formation of the end products, require the customary aftermixer and film gates, replacement molds could be built cheaper than in the case of presently known RIM processes, where such aftermixer and film gates have to be integrated into the mold.

In the past, several approaches have been taken in an effort to expand the applicability of high pressure impingement mixing systems. Such designs were directed to modifying the flow conditions of the mixture at the mixing head outlet, which in high pressure equipment is characteristically turbulent, to achieve laminar, non-splashing flow at the dispense outlet of the mixing head for open pour applications. One example of such a device is shown in my prior U.S. Pat. No. 4,175,874. Krauss Maffei and Cannon market a laminar dispense device in the form of an L-shaped mixing head. In such devices, the reactants are mixed in a mixing chamber having relatively small dimension, and the mixture thereafter flows into a larger dispense cylinder arranged at a right angle to the mixing chamber to effect a discontinuity in the direction of flow. Bayer-Hennecke currently markets a mixing head in which reactants are directed at one another from opposite sides of the dispense chamber, where they mix. A flow restriction is interposed between the mixing portion and the outlet of the dispense chamber so as to achieve the flow discontinuity of the turbulent flowing mixture and effect laminar flow at the outlet. While the achievement of laminar flow does improve the ability to use high pressure mixing systems in open pour applications, such presently known devices still do not produce satisfactory results when used in the applications described above.

SUMMARY OF THE INVENTION

The present invention is a high pressure impingement mixing apparatus for mixing and dispensing two or more liquid components, which provides effective and thorough mixing of reactants and which dispenses a thoroughly mixed, laminar flow emulsion. The device may be used in place of known high pressure reaction injection molding systems without the need for utilizing conventional aftermixers and film gates. The device may also effectively be used in place of low pressure mixing systems in open mold operations, where due to the materials involved high pressure mixing apparatus has heretofore been ineffective.

More particularly, a high pressure impingement mixing apparatus in accordance with the invention includes a mixing chamber, into which two or more reactants are injected at high velocity, an integral aftermixer chamber arranged to receive the output from the mixing chamber and perpetuate turbulence conditions to effect thorough mixing, and a transfer dispense chamber arranged to receive the mixture from the aftermixer chamber, convert the flow from turbulent to laminar, and thereafter dispense the mixed reactants.

In a preferred embodiment, a mixing head includes a transfer dispense chamber with a hydraulically actuated cleaning plunger therein. The mixing chamber, which receives the reactants, is arranged at right angles to the transfer dispense chamber. Apparatus for introducing the reactants into the mixing chamber for impingement mixing, and for selectively interrupting the delivery of the components, are known. An especially advantageous system for delivering reactants to a mixing chamber is shown and described in my prior U.S. Pat. No. 4,239,732. Delivery and interruption of the components is controlled by a hydraulically actuated plunger arranged in the mixing chamber, which when moved to its extended position to block mixing, also purges the mixing chamber of mixed components remaining therein.

The mixing head also includes the cylindrical aftermixture chamber, with a correspondingly arranged hydraulically actuated cleaning plunger. The axis of the impingement mixing chamber meets the axis of the cylindrical transfer dispensing chamber at a right angle. The aftermixer chamber is also at right angles to the transfer dispense chamber. The mixing and aftermixer chambers are arranged on opposite sides of the transfer dispense chamber, such that the output from the mixing chamber is directed across the transfer dispense cylinder into the aftermixer chamber. The aftermixer chamber has a larger diameter than the mixing chamber. Preferably, the center of the cylindrical aftermixer chamber is such that the flow stream exiting the mixing chamber is directed into the lower portion of the aftermixer chamber.

For dispense operation, the various devices of the mixing apparatus are actuated in the sequence as described below. First, the transfer dispense chamber is opened by retracting the dispense plunger. Second, the aftermixer chamber is opened by retracting the aftermixer plunger. And third, preferably simultaneously with the opening of the aftermixer chamber, the mixing chamber is opened by retracting the cleaning plunger of the mixing device. With the retraction of the mixing chamber plunger, impingement mixing is initiated by the opening of the impingement nozzles to the mixing chamber. The materials dispensed from the mixing chamber leaves the mixing chamber, which is relatively small in cross-sectional diameter, at a relatively high speed and is directed across the transfer dispense chamber where it enters the lower section of the aftermixer chamber.

Once the flow enters the aftermixer chamber, the material encounters the rear wall of the aftermixture chamber (the front face of the aftermixer plunger), where it is deflected back towards the transfer dispense chamber. The deflection occurs mainly in the upper direction because of the arrangement of the chamber and geometry, and the diverted flow is directed back into the upper portion of the transfer dispense chamber. From there, the flow has to pass around the flow stream traveling between the mixing chamber and the aftermixer chamber (i.e. crossing the transfer dispense chamber). Thus, the flow stream exiting the impingement mixing device is initially transferred across the transfer dispense chamber, to the aftermixer chamber, and thereafter returned to the transfer dispense chamber to be dispensed.

An arrangement in accordance with the invention effects highly turbulent flow conditions, not only in the original mixing chamber, but also in the aftermixer chamber and the upper section of the transfer dispense chamber. The turbulence is maintained by the deflection pattern of the flow stream in the aftermixer, which is facilitated both by the deflection of the flow and also by the continuous counterflowing conditions of the materials in the aftermixer chamber. Turbulence is also maintained in that the mixture, upon exiting the aftermixer chamber and re-entering the transfer dispense chamber, is disposed above the high velocity crossing flow of components leaving the mixing chamber, and to reach the transfer dispense cylinder outlet must flow around this crossing flow. A liquid particle passes statistically several times through the turbulence area before it enters, finally, the transfer dispense chamber.

Once in the transfer dispense chamber and having flowed around the high speed mixing chamber crossing flow, in accordance with the law of continuity the flow in the transfer dispense chamber is slowed down proportionately to the relationship of the flow areas. Prior to reaching the dispensing chamber outlet, the flow pattern becomes laminar so as to leave the dispense opening in a steady, non-splashing stream.

To terminate a mixing cycle, the various plungers are actuated in a reverse sequence. The mixing chamber piston is moved to its extended position, to block the further delivery of reactants into the mixing chamber, thereby terminate mixing, at the same time pushing out the reactants in the mixing chamber. The aftermixer plunger is then moved to its extended position, to clean out mechanically the aftermixer chamber, and finally the cleaning plunger of the dispense mechanism is actuated for reaming out the remnant material in the transfer dispense chamber.

The opening and closing sequences are executed on the order of tenths of seconds. The cycling time for the dispense operation is controlled in accordance with the application requirements. Typically, a dispense cycle ranges from the order of tenths of a second up to thirty seconds or more.

If desired, the mixing apparatus can incorporate delivery systems for further liquid or gaseous components, for example, coloring agents, catalysts, blowing agents, air or nitrogen. Advantageously, such additives are dispensed into the mixture in the afterchamber, where they are mixed with the main components while the main components are still in turbulent flow conditions.

A mixing apparatus in accordance with the invention may be adapted to different sizes and geometries for meeting different capacity requirements in individual applications. The use of an arrangement for delivering the individual components into the mixing chamber of the type shown in U.S. Pat. No. 4,239,732, facilitates the construction of mixing apparatus both of small capacity, allowing pour rates of 50 g/sec and less, as well as large capacity units. As a result, the present invention may be employed to produce small as well as large parts in accordance with the free pour method, as may be presently done only with low pressure machines.

Mixing apparatus in accordance with the present invention can also be used advantageously for pouring or injection of reactive material into closed molds. Due to the improved initial mixing in the integrated mixing chamber and aftermixer chambers, the use of conventional aftermixing devices, which are normally built into each individual mold, are rendered obsolete. In addition, the invention results in savings of raw material, by the reduction of waste material, since in accordance with the invention shorter runners may be used from the fill port to the mold cavity.

For a better understanding of the invention, reference is made to the following detailed description of a preferred embodiment, taken in conjunction with the appended drawings.

DETAILED DESCRIPTION OF A PREFERRED EMBODIMENT

Figure 1:
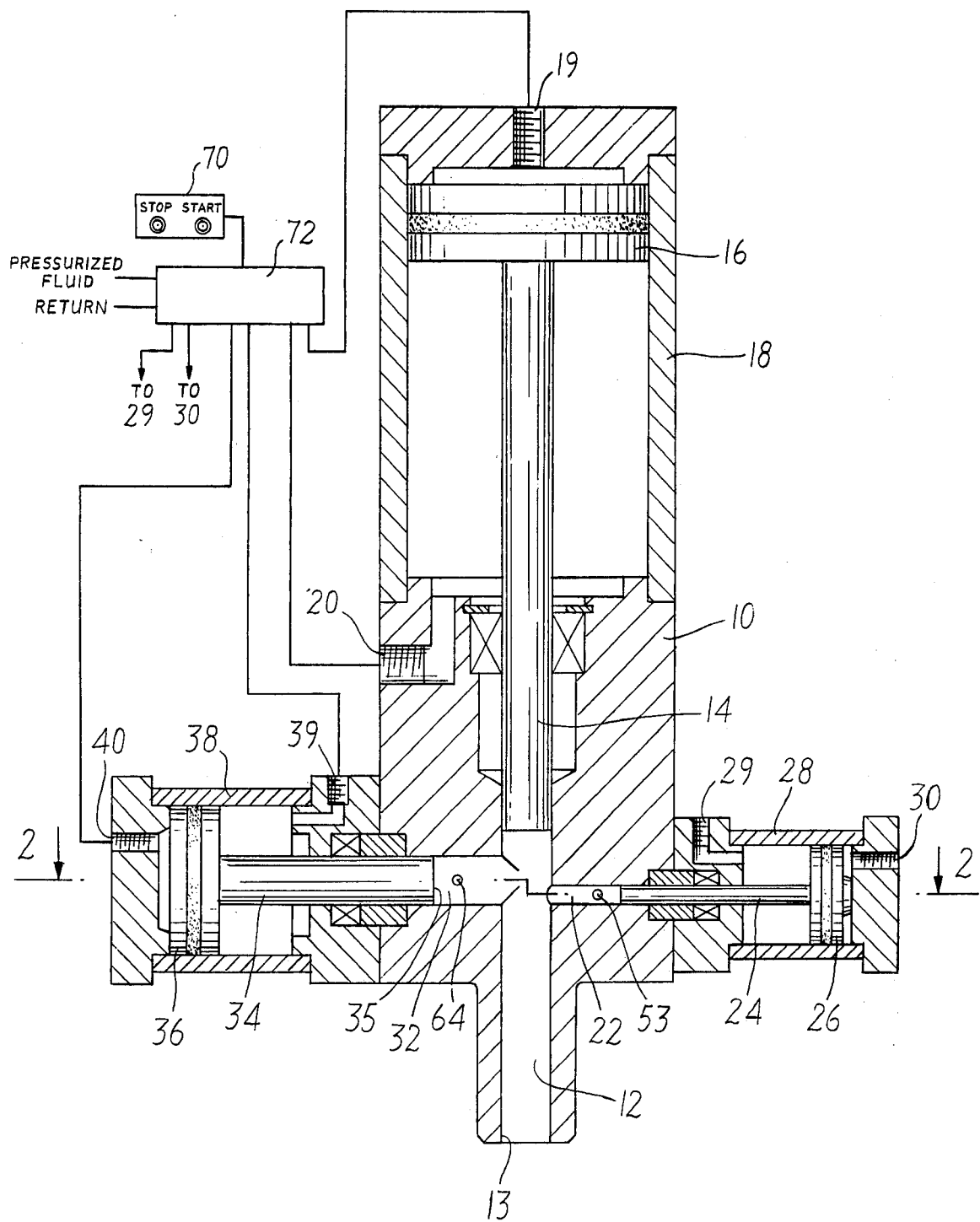
FIG. 1 is a sectional view of an example of mixing apparatus in accordance with the invention, shown in the open position for mixing and dispensing.
Figure 2:
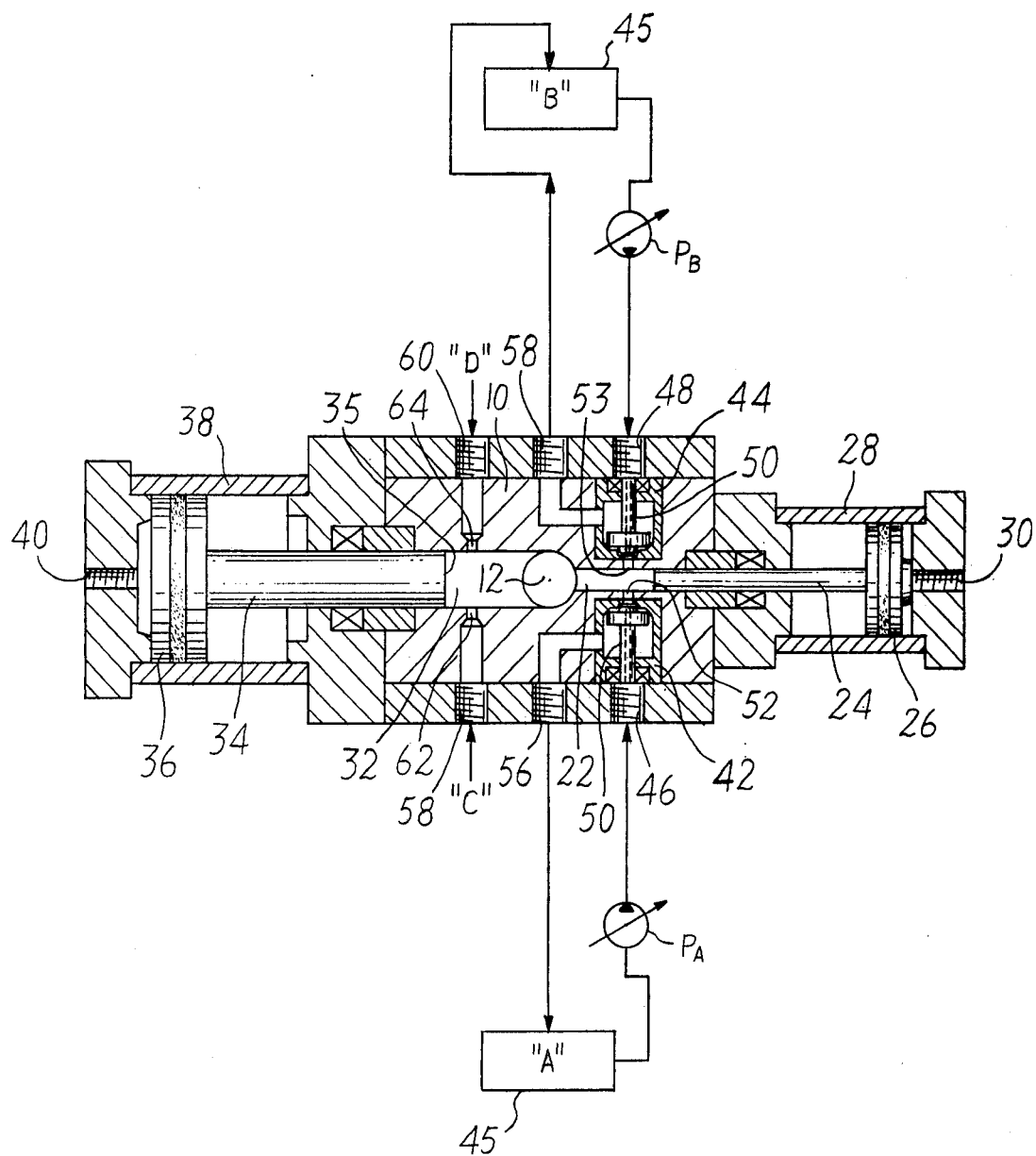
FIG. 2 is a sectional view taken through lines 2—2 of FIG. 1.

Referring to FIGS. 1 and 2, a mixing head housing 10 includes a transfer dispense chamber 12, with a cleaning plunger 14 arranged therein, having an outlet 13 for dispensing mixed components. The cleaning plunger 14 is selectively extendable between a retracted position (shown) and an extended position by a piston 16 enclosed in a cylinder 18. The cleaning plunger 14 is actuated by introduction of hydraulic fluid into the port hole 19 or 20

The mixing head housing 10 is also provided with a mixing chamber 22, in which is disposed a cleaning plunger 24. The plunger 24 is displaceable between the retracted position (shown) and an extended position, in which the front face of the plunger 24 extends to the transfer dispense chamber 12, by an actuating piston 26. The mixing chamber piston 26 is enclosed in a cylinder 28, and actuated by the introduction of hydraulic fluid in the port hole 29 or 30. Opposite to the mixing chamber 22 is located an aftermixer chamber 32, which as shown is larger in diameter than the mixing chamber 22. A cleaning plunger 34 is disposed in the aftermixer chamber 32 and is selectively displaceable between the retracted position (shown) and an extended position in which the front face 35 thereof extends to the dispense transfer chamber 12. The plunger 34, through an associated piston 36 disposed in a cylinder 38, is movable between the retracted and extended positions by hydraulic fluid introduced through port hole 39 or 40.

Referring to FIG. 2, the mixing head housing 10 further includes injection devices 42 and 44 for introducing two pressurized main components "A" and "B" to the mixing chamber 22 for impingement mixing. Preferably each of the injection devices 42 and 44 has structure as shown and described in my prior U.S. Pat. No. 4,239,732, the pertinent portions of which are incorporated herein by reference. In such an arrangement, the two main components "A" and "B" are provided from their respective reservoirs 45 under pressure, by pumps $P_A$ and $P_B$, to inlets 46 and 48. The inlets communicate with a longitudinally displaceable plunger 50, each having a longitudinal passage therethrough, such that the individual reactants "A" and "B" pass through the plunger passage and exit the forward end.

In the mixing position shown, where plunger 24 is in the retracted position, the forward ends of the plungers 50 are pressed forward, by the force of the pressurized fluid passing therethrough, against nozzle orifices 52 and 53, which open into the mixing chamber 22. The pressurized components "A" and "B" are accelerated through the nozzle openings 52 and 53 such that the reactive materials are impinged at high velocity in the mixing chamber 22.

As disclosed in U.S. Pat. No. 4,239,732, mixing is initiated and interrupted by the retraction and extension of the plunger 24. As the plunger 24 moves to the extended position, flow through the nozzle inlets 52 and 53 is simultaneously blocked to interrupt delivery of the reactants to the chamber 22. Blocking of the flow through the inlet openings 52 and 53 causes the plungers 50 to retract to initiate recirculation of the flowing components "A" and "B" through recirculation lines 56 and 58. Correspondingly, when the plunger 24 is again retracted to initiate mixing, pressure in the reactant delivery plungers 50 causes the plungers 50 to move forward to direct the already flowing component (recirculating) into the mixing chamber. Mixing is initiated and interrupted without lead lag problems, and without creating pressure fluctuations or pulses in the metering systems.

U.S. Pat. No. 4,239,732, the disclosure of which is incorporated herein, discloses various embodiments of injection apparatus that may be used in the present invention, in which the injection nozzle is arranged in the inlet openings 52, 53 or in the plunger passages. However, the particular form of the injection apparatus, for delivering and injecting the components into the mixing chamber 22, does not form part of the present invention, and other constructions of injection apparatus may be used.

As shown in FIG. 2, the transfer dispense housing 10 may include additional orifices 58 and 60, for introducing additional components "C" and "D" into the aftermixer chamber 32, through inlets 62 and 64, when plunger 34 is retracted.

Figure 3:
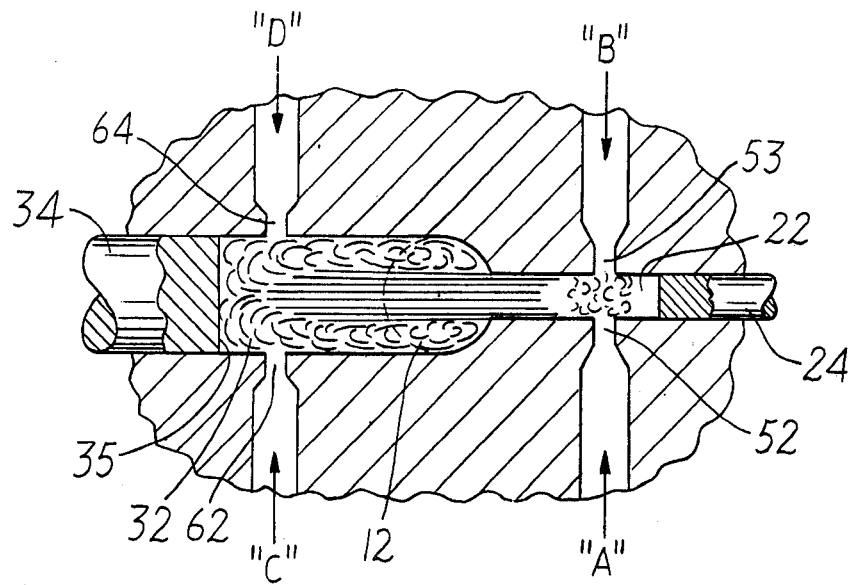
FIGS. 3 and 4 are, respectively, schematic top and front sectional views of a portion of the apparatus for FIG. 1, indicating the flow pattern of the mixed material through the device.
Figure 4:
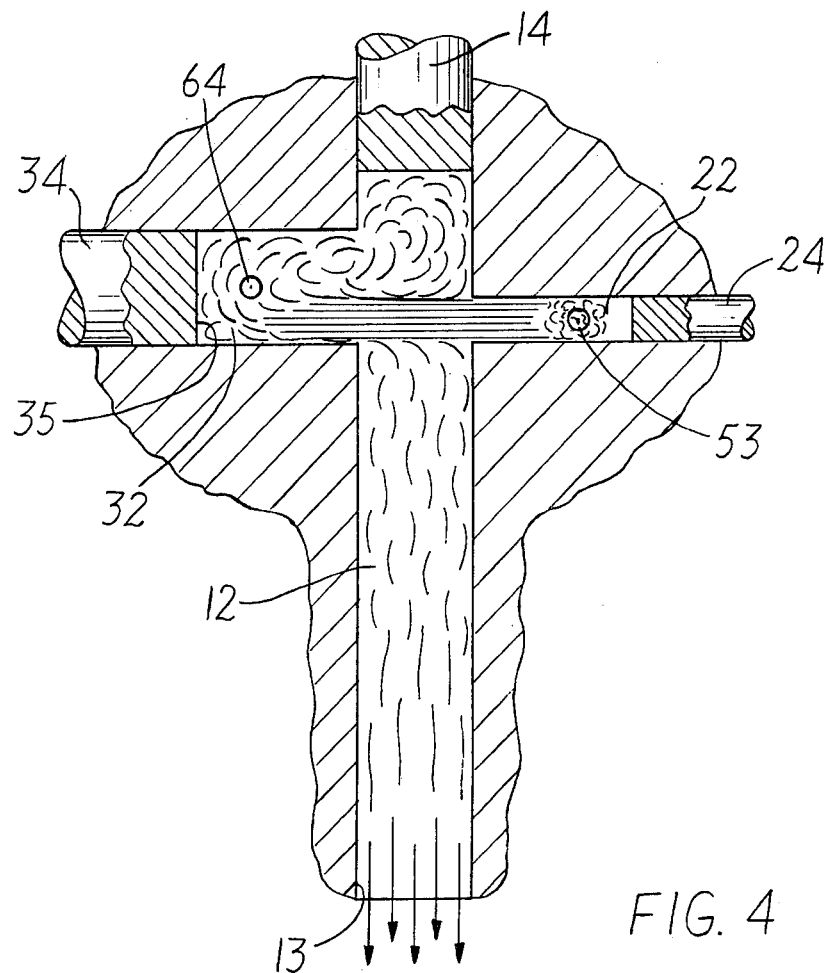

FIGS. 1-4 show the mixing apparatus in the open, mixing position. The primary components "A" and "B" are supplied by the metering pumps $P_A$ and $P_B$ (FIG. 2) at a pressure of approximately 1500 to 3000 psi to the inlets 46 and 48. FIGS. 3 and 4 illustrate the flow stream of the mixed material. For purposes of simplification, the injection apparatus 42 and 44 are omitted in these figures. The components "A" and "B" enter the mixing chamber, through the inlets 52 and 53, at relatively high velocity. The flow stream of mixed material thereafter leaves the mixing chamber 22 with a relatively high speed (20–50 ft/sec) and is shot across the transfer dispense chamber 12 into the aftermixer chamber 32.

In the aftermixer chamber 32, the flow stream is deflected by 180° at the front face 35 of the cleaning plunger 34. Highly turbulent conditions are achieved. The mixed material is recirculated statistically several times in the area shown in FIGS. 3 and 4 until it is finally discharged at the outlet opening 13 of the transfer dispense chamber 12. As shown in the figures, in addition to the mixing encountered in the aftermixer chamber 32, the mixed material, once it leaves the aftermixer chamber 32, back into the transfer dispense chamber 12, is disposed above the crossing flow from the mixing chamber 22, and thereafter must flow around the crossing flow as it travels toward the discharge opening 13 of the dispense chamber 12. Thus, turbulence is enhanced by the reversal of flow in the aftermixer chamber 32, the counter-flowing mixtures in the chamber 32, and the interaction of the exiting and crossing mixtures in chamber 12.

The dispense transfer chamber 12 is designed to have a length sufficient to allow transition from turbulent to laminar flow conditions prior to the mixed reactants reaching the outlet. The discharge speed can be low as approximately 2 to 5 ft./sec. depending upon the capacity and the flow area.

If the mixing apparatus is provided with inlet nozzles 62 and 64, additional components may be introduced into the turbulent mixture in the aftermixer chamber 32. Such additives can include coloring agents, catalysts, blowing agents, air, or nitrogen.

At the end of a dispense cycle, the operation is interrupted by first moving the mixing chamber plunger 24 to its extended position. Such will block the outlets 52 and 53, and cause the injection devices 42 and 44 to initiate recirculation. The plunger is extended to a position to be flush with the dispense transfer chamber 22, to mechanically clean out the bore of the mixing chamber 22 of reactant mixture. Once the delivery of the components "A" and "B" is interrupted, the aftermixer plunger 34 is actuated to move it to its extended position. Extension of the plunger 34 likewise cleans the aftermixer chamber 32 of mixed components, pushing such components into the transfer dispense chamber 12. If additional components are being introduced through inlets 60 and 62, extension of the plunger 34 interrupts further delivery of such components. Finally, when both plungers 22 and 34 have been moved to be flush with transfer dispense chamber 12, the transfer dispense plunger 14 is moved to its extended position to push out the remaining mixed reactants from the transfer dispense chamber 12. Thus, the plungers 24, 34 and 14 act to effectively ream out the mixed reactants and clean the device for the next cycle.

To reinstitute the pouring (open mold) or dispensing (closed mold) operation, the plunger 14 is retracted, and after a brief time delay, the cleaning plunger 34 of the aftermixer chamber 32 and the cleaning plunger 24 of the mixing chamber 22 are retracted. This starts immediately the impingement of the reactive components through the orifices 52 and 53 in the mixing chamber 22. If additional components are to be supplied through inlets 60 and 62, the plungers 24 and 34 are preferably retracted simultaneously.

The above-described sequences for actuating the plungers 14, 24 and 34 are typically carried out in tenths of a second. It is, therefore, preferable to carry out commands for initiating and terminating mixing using an automatic sequencing timer control 70. Actuation of the control 70, to start and stop mixing, may be either operator controlled or automatic. Upon actuation of control 70, electrical, pneumatic, or other control signals actuate hydraulic valves control 72 for delivering pressurized fluid, in the appropriate sequence, to inlet ports 19, 20; 19, 30; and 39, 40.

The embodiments which have been described above are merely illustrative of the present invention. Variations and modifications of the preferred embodiment described will be apparent to persons skilled in the art without departing from the inventive concepts disclosed in the specification. For example, while the axes of the mixing chamber 22 and aftermixer chamber 32 are shown as parallel, and the mixing chamber 22 is arranged to be opposite the lower portion of the aftermixer chamber 32, modifications of the flow direction of the premixed material to the after-chamber, can be made for optimizing the turbulence effect. All such modifications and variations are intended to be within the scope of the invention as defined in the following claims.

I claim:

1. Apparatus for high pressure impingement mixing of at least two liquid components comprising:
   a housing having a transfer dispense chamber including a first opening, a second opening, and an outlet for dispensing mixed components;
   an impingement mixing chamber means for impingement mixing of liquid components and for directing said components through said first opening into said transfer dispense chamber, and across said transfer dispense chamber out through said second opening, said means including an impingement mixing chamber, injection means for introducing said at least two liquid components into said mixing chamber for impingement mixing thereof, and a reciprocatable plunger for selectively cleaning said mixing chamber;
   an aftermixer chamber means, including an aftermixer chamber communicating with said second opening, for receiving mixed components directed from said mixing chamber means, for further mixing said components in said aftermixer chamber, and for returning said mixed components delivered thereto to said transfer dispense chamber such that the returned components are dispensed through said outlet;
   second plunger means disposed in said aftermixer chamber for mechanical cleaning of said aftermixer chamber; and
   third plunger means disposed in said transfer dispense chamber for mechanical cleaning of said transfer dispense chamber after a dispense operation.

2. Apparatus as defined in claim 1, wherein said mixing chamber and said aftermixer chamber are disposed on substantially opposite sides of said transfer dispense chamber and are is oriented substantially perpendicular to said transfer dispense chamber.

3. Apparatus as defined in claim 2, wherein said aftermixer chamber is larger, in cross-sectional area, than said mixing chamber, and wherein said mixing chamber means includes means for projecting mixed components across said transfer dispense chamber solely into a lower portion of said aftermixer chamber.

4. Apparatus as defined in claim 3, wherein said mixing chamber means includes means for projecting said mixed components into said aftermixer chamber under turbulence conditions, wherein said aftermixer chamber means includes means for maintaining turbulence conditions of said mixed components in said aftermixer chamber, and wherein said transfer dispense chamber includes means for converting said mixed components from turbulence conditions to laminar flow conditions prior to being dispensed through said outlet.

5. Apparatus as defined in claim 2, wherein said aftermixer chamber has at least one inlet for the introduction of additional material components.

6. Apparatus as defined in claim 2, comprising means for actuating said plungers in a pre-selected sequence for initiating and terminating mixing conditions.

7. A method of high pressure impingement mixing of at least two liquid components comprising the steps of:
  (a) delivering each said component under pressure to an injection device;
  (b) directing said components through said injection device into a mixing chamber for impingement mixing thereof to form a mixture of said components;
  (c) directing said mixture from said mixing chamber, across a transfer dispense chamber, into an aftermixer chamber;
  (d) directing said mixture from said aftermixer chamber back into said transfer dispense chamber, and toward an outlet of said transfer dispense chamber, wherein said transfer dispense chamber has means for dispensing said mixture under laminar conditions at said outlet; and
  (e) dispensing said mixture from said outlet.

8. A method as defined in claim 7, wherein said transfer dispense chambers oriented perpendicular to said mixing chamber and said aftermixer chamber.

9. A method as defined in claim 8, wherein said aftermixer chamber has a cross-sectional diameter larger than said mixing chamber, wherein said mixture is directed from said mixing chamber across said transfer dispense chamber and solely into a lower portion of said aftermixer chamber, and wherein said mixture, returned from said aftermixer chamber to said transfer dispense chamber, is passed around the mixture crossing from said mixing chamber to said aftermixer chamber, prior to being dispensed at said outlet.

10. A method as defined in claim 8, wherein each said chamber has a plunger disposed therein for cleaning the respective chamber, and wherein mixing is interrupted by actuating sequentially the plunger in said mixing chamber, the plunger in said aftermixer chamber, and the plunger in said transfer dispense chamber.

11. A method as defined in claim 8, wherein said components are injected into said mixing chamber to form a mixture under turbulence conditions, and wherein said mixture, directed into said afterchamber, is maintained at turbulence conditions.

12. A method as defined in claim 7, comprising further the step of introducing an additional component into said mixture in said aftermixer chamber.

* * * * *